(12) United States Patent
Hosono et al.

(10) Patent No.: US 7,462,334 B2
(45) Date of Patent: Dec. 9, 2008

(54) NEGATIVELY-CHARGED OXYGEN ATOM PRODUCING METHOD AND PRODUCING APPARATUS

(75) Inventors: Hideo Hosono, Yamato (JP); Katsuro Hayashi, Kawasaki (JP); Masahiro Hirano, Tokyo (JP); Masayoshi Sadakata, Tokyo (JP)

(73) Assignees: Japan Science and Technology Agency, Kawaguchi-shi (JP); Oxy Japan Company Limited, Tokyo (JP)

( * ) Notice: Subject to any disclaimer, the term of this patent is extended or adjusted under 35 U.S.C. 154(b) by 924 days.

(21) Appl. No.: 10/498,321
(22) PCT Filed: Dec. 11, 2002
(86) PCT No.: PCT/JP02/12959
§ 371 (c)(1), (2), (4) Date: Jun. 10, 2004
(87) PCT Pub. No.: WO03/050037
PCT Pub. Date: Jun. 19, 2003

(65) Prior Publication Data
US 2005/0061657 A1 Mar. 24, 2005

(30) Foreign Application Priority Data
Dec. 11, 2001 (JP) .............................. 2001-377293

(51) Int. Cl.
*B01J 19/08* (2006.01)
*C25B 1/02* (2006.01)

(52) U.S. Cl. .................. 422/186.04; 204/263; 205/634
(58) Field of Classification Search ............ 422/186.04; 204/263; 205/634
See application file for complete search history.

(56) References Cited

FOREIGN PATENT DOCUMENTS

| | | | |
|---|---|---|---|
| JP | 09-110599 | | 4/1997 |
| JP | 09-183602 A | * | 7/1997 |
| WO | WO 96/17803 | | 6/1996 |
| WO | WO 01/79115 | | 10/2001 |

* cited by examiner

*Primary Examiner*—Kishor Mayekar
(74) *Attorney, Agent, or Firm*—Westerman, Hattori, Daniels & Adrian, LLP.

(57) ABSTRACT

The present invention provides a method for producing negatively charged oxygen atoms comprising: placing a negative electrode (3) on a surface of a member (2) made of calcium-aluminum composite oxide, proximately placing a positive electrode (10) on a side of the member opposite to the surface on which the negative electrode is placed, supplying oxygen to the negative electrode side, and applying voltage between the negative electrode and the positive electrode so as to extract negatively charged oxygen atoms (A) from the side where the positive electrode (10) is placed. The present invention also provides an apparatus for producing negatively charged oxygen atoms which is used for the above method.

12 Claims, 8 Drawing Sheets

Oxygen

Calcium

Aluminum (A)

(B)

NEGATIVELY-CHARGED OXYGEN ATOM PRODUCING METHOD AND PRODUCING APPARATUS

This is a national stage of International Application PCT/JP02/12959, with an international filing date of Dec. 11, 2002, and claims priority to Japanese Application Number JP 2001-377293, filed on Dec. 11, 2001.

BACKGROUND OF THE INVENTION

The present invention relates to a method for producing negatively charged oxygen atoms and an apparatus for producing negatively charged oxygen atoms which may be employed for the aforementioned method. Negatively charged oxygen atoms are represented by $O^-$ and come in very useful in various fields, for example, for oxidative reaction in gaseous phase, fabrication of silicon oxidized film in semiconductor manufacturing process, mildew-proof treatment of fruits such as strawberries, maintaining sea food freshness such as maintaining tuna freshness.

As a method for producing negatively charged oxygen atoms, it is known to bring low-energy electrons to adhere to oxygen atoms generated by electric discharge and the like, thereby producing negatively charged oxygen atoms. However, this method has a problem that high vacuum is required for causing electric discharge and a problem in view of energy.

Another known method is a method in which ozone is generated by electric discharge in an oxygen gas, the resulting ozone is irradiated with ultraviolet rays, whereby low-energy electrons adhere to the resulting oxygen to produce negatively charged oxygen atoms (JP62237733A). However, this method has a problem that a large quantity of discharge energy is required for generating ozone.

The present invention aims to provide a method and an apparatus for effectively producing negatively charged oxygen atoms without requiring such high vacuum and such discharge energy.

DISCLOSURE OF THE INVENTION

The present invention provides a method for producing negatively charged oxygen atoms comprising: placing a negative electrode on a surface of a member made of calcium-aluminum composite oxide; placing a positive electrode on a side of the member opposite to the surface on which the negative electrode is placed; supplying oxygen to the negative electrode side; and applying voltage between the negative electrode and the positive electrode so as to extract negatively charged oxygen atoms from the side where the positive electrode is placed.

In the method for producing negatively charged oxygen atoms, the voltage is applied while heating the member to a temperature of from 200° C. to 1000° C.

In the method for producing negatively charged oxygen atoms, the calcium-aluminum composite oxide is prepared by baking a mixture of calcium carbonate and aluminum oxide.

In the method for producing negatively charged oxygen atoms, the calcium-aluminum composite oxide is prepared by baking the calcium carbonate and the aluminum oxide at a baking temperature of from 1300° C. to 1450° C.

In the method for producing negatively charged oxygen atoms, the calcium carbonate and the aluminum oxide are baked in dry oxygen atmosphere of which oxygen partial pressure is 10 kPa or more and the vapor partial pressure is $10^{-3}$ Pa or less.

In the method for producing negatively charged oxygen atoms, the calcium-aluminum composite oxide has a molar ratio between calcium carbonate and aluminum oxide is 12:7.

The present invention provides an apparatus for producing negatively charged oxygen atoms having an oxygen supply compartment and a negatively charged oxygen atom producing compartment which are defined by arranging a member made of calcium-aluminum composite oxide, the apparatus comprising a heating means disposed on the member made of calcium-aluminum composite oxide, a negative electrode placed on a surface of the member facing the oxygen supply compartment, a positive electrode placed in the negatively charged oxygen atom producing compartment on a side of the member opposite to the surface on which the negative electrode is placed, and a power source for applying voltage between the positive electrode and the negative electrode.

In the apparatus for producing negatively charged oxygen atoms, the positive electrode is placed on the side of the member made of calcium-aluminum composite oxide opposite to the surface of the member on which the negative electrode is placed such that the positive electrode is spaced apart from the member made of calcium-aluminum composite oxide.

In the apparatus for producing negatively charged oxygen atoms, in place of the positive electrode, a conductive target object to be processed is placed on the side of the member made of calcium-aluminum composite oxide opposite to the surface of the member on which the negative electrode is placed such that the conductive target object is spaced apart from the member made of calcium-aluminum composite oxide, and wherein voltage is applied between the conductive target object and the negative electrode.

In the apparatus for producing negatively charged oxygen atoms, the positive electrode is placed on a spacer which is attached to the surface of the member made of calcium-aluminum composite oxide opposite to the surface of the member on which the negative electrode is placed.

In the apparatus for producing negatively charged oxygen atoms, a control electrode is arranged between the positive electrode and the target object to be processed with negatively charged oxygen atoms.

In the apparatus for producing negatively charged oxygen atoms, the calcium-aluminum composite oxide is prepared by baking a mixture of calcium carbonate and aluminum oxide.

In the apparatus for producing negatively charged oxygen atoms, the calcium-aluminum composite oxide has a molar ratio between calcium carbonate and aluminum oxide is 12:7.

The present invention also provides a processing equipment for conducting process by negatively charged oxygen atoms having an oxygen supply compartment and a negatively charged oxygen atom producing compartment which are defined by arranging a member made of calcium-aluminum composite oxide, the processing equipment comprising a heating means disposed on the member made of calcium-aluminum composite oxide, a negative electrode placed on a surface of the member facing the oxygen supply compartment, a positive electrode placed in the negatively charged oxygen atom producing compartment on a side of the member opposite to the surface on which the negative electrode is placed, and a power source for applying voltage between the positive electrode and the negative electrode, wherein a target object to be processed is placed on a side of the positive electrode opposite to the side where the negative electrode is provided.

BEST MODE FOR CARRYING OUT THE INVENTION

The present invention was made based on a find that the following method is capable of producing negatively charged oxygen atoms without requiring a large amount of discharge energy which is conventionally required. The method comprising: placing a negative electrode on a layer made of calcium-aluminum composite oxide of which a molar ratio between calcium oxide and aluminum oxide is 12:7, placing a positive electrode in a space apart from the layer made of the calcium-aluminum composite oxide on a side opposite to the side where the negative electrode is placed, and applying a relatively low voltage between the negative electrode and the positive electrode.

That is, it was found that the calcium-aluminum composite oxide amazingly exhibits excellent effect of emitting negatively charged oxygen atoms from the inside thereof to the outside when applied with a voltage.

Though it is not known exactly why the calcium-aluminum composite oxide emits negatively charged oxygen atoms when applied with a voltage, the reasons may be conjectured from the followings.

Figure 1:
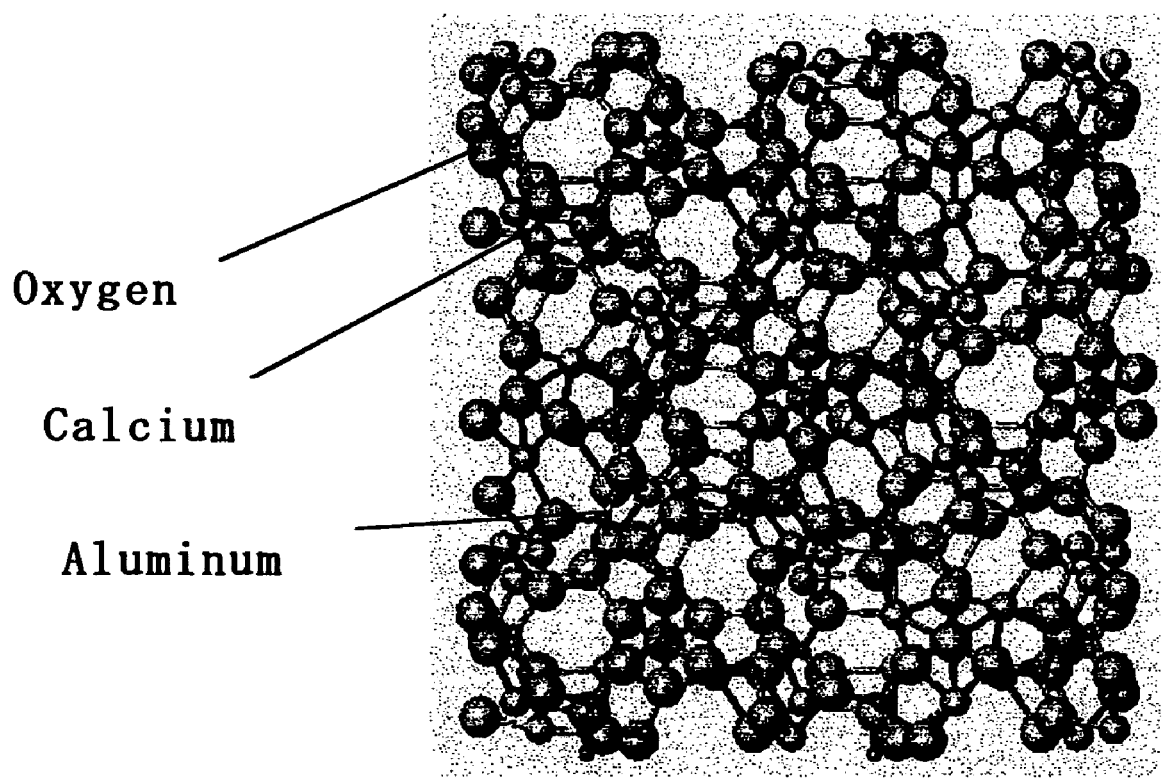
FIG. 1 shows crystal structure of 12CaO·7Al$_2$O$_3$ (C12A7) as a typical structure of a calcium-aluminum composite oxide.

FIG. 1 shows a crystal structure of 12CaO·7Al$_2$O$_3$ (C12A7) as a typical structure of a calcium-aluminum composite oxide.

Oxygen molecule (O$_2$) in ambient atmosphere is trapped in the crystal structure of C12A7 and reacts with free oxygen ion (O$_2^-$) existing inside thereof so that O$_2^-$ is converted to a pair of O$_2^-$ ion and O$^-$ ion.

During a voltage is applied to C12A7, O$^-$ ions pass through the crystal lattice and are thus emitted as O ions, O$_2^-$ ions may be not emitted because O$_2^-$ ions have larger diameter.

The calcium-aluminum composite oxide can be made up of calcium source and aluminum source in oxidation atmosphere. Though the raw material may be any of compounds each containing elements which evaporate as gases when the compound is baked and are not left in a baked matter, such compounds including carbonates, organic acid chlorides, hydroxides, and oxides. However, the preferable raw material is a mixture of calcium carbonate and aluminum oxide.

The case of using the mixture of calcium carbonate and aluminum oxide will be described. The mixing ratio between calcium carbonate and aluminum oxide is preferably adjusted such that the molar ratio therebetween is 12/7.

The baking of the mixture of calcium carbonate and aluminum oxide is preferably performed in atmosphere in which oxygen partial pressure and water vapor partial pressure are adjusted. The oxygen partial pressure is preferably adjusted to be 10.1 kPa or more. The atmosphere may contain inert gas such as argon as well as oxygen.

If the oxygen partial pressure is insufficient, the amount of oxygen molecule to be taken into crystal structure during forming reaction process of a calcium-aluminum composite oxide must be small, thus reducing the production efficiency of negatively charged oxygen atoms.

The water vapor partial pressure is preferably 100 Pa or less, more preferably 10 Pa or less. That is, dry oxygen atmosphere is preferable.

When a large quantity of moisture exists in oxygen atmosphere, OH$^-$ ions in the moisture are taken in the baked matter so as to reduce the efficiency of uptake of oxygen into the crystal structure.

The atmosphere containing oxygen may be air or a mixture of oxygen and an inert gas such as nitrogen or argon gas. To prepare a highly-purified composite oxide composed of calcium carbonate and aluminum oxide, it is preferable to use highly-purified oxygen or a mixture of oxygen and an inert gas atmosphere.

The temperature of baking the calcium carbonate and the aluminum oxide is preferably 1200° C. or more, more preferably from 1300° C. to 1450° C.

The time period of baking is preferably from 4 to 8 hours, more preferably from 5 to 7 hours.

The calcium-aluminum composite oxide may be formed in a predetermined configuration to be a self-standing member. Alternatively, a calcium-aluminum composite oxide layer may be formed on a porous substrate having heat resistance.

Examples of methods for forming the member of calcium-aluminum composite oxide or the calcium-aluminum composite oxide layer include a method of baking a molded body made of powder or a coating layer and coating methods not transforming oxides of raw material such as plasma spraying and sputtering.

In both the case of forming the self-standing member and the case of forming the calcium-aluminum composite oxide layer on the porous substrate having heat resistance, it is preferable to form a dense member or a dense layer not permitting the transmission of gas.

In case of forming a molded body by baking, a binder blended in the calcium-aluminum composite oxide may affect the generation of negatively charged oxygen atoms. Therefore, it is preferable to bake a molded body which was molded without using a binder. To achieve this, the calcium-aluminum composite oxide is preferably molded under pressure by press molding, HIP molding, or the like and, after that, is baked.

The baking is preferably carried out at a temperature of 1200° C. or more, preferably a temperature of from 1300° C. to 1450° C. The time period of baking is preferably from 4 to 8 hours, more preferably from 5 to 7 hours.

The configuration and size of the baked body from the molded body may be any configuration and any size according to the corresponding application. The configuration and structure are preferably decided considering the transmission rate of gas of the obtained molded body and the pressure to be applied to the baked body.

An apparatus for producing negatively charged oxygen atoms of the present invention will be described with reference to drawings.

Figure 2:
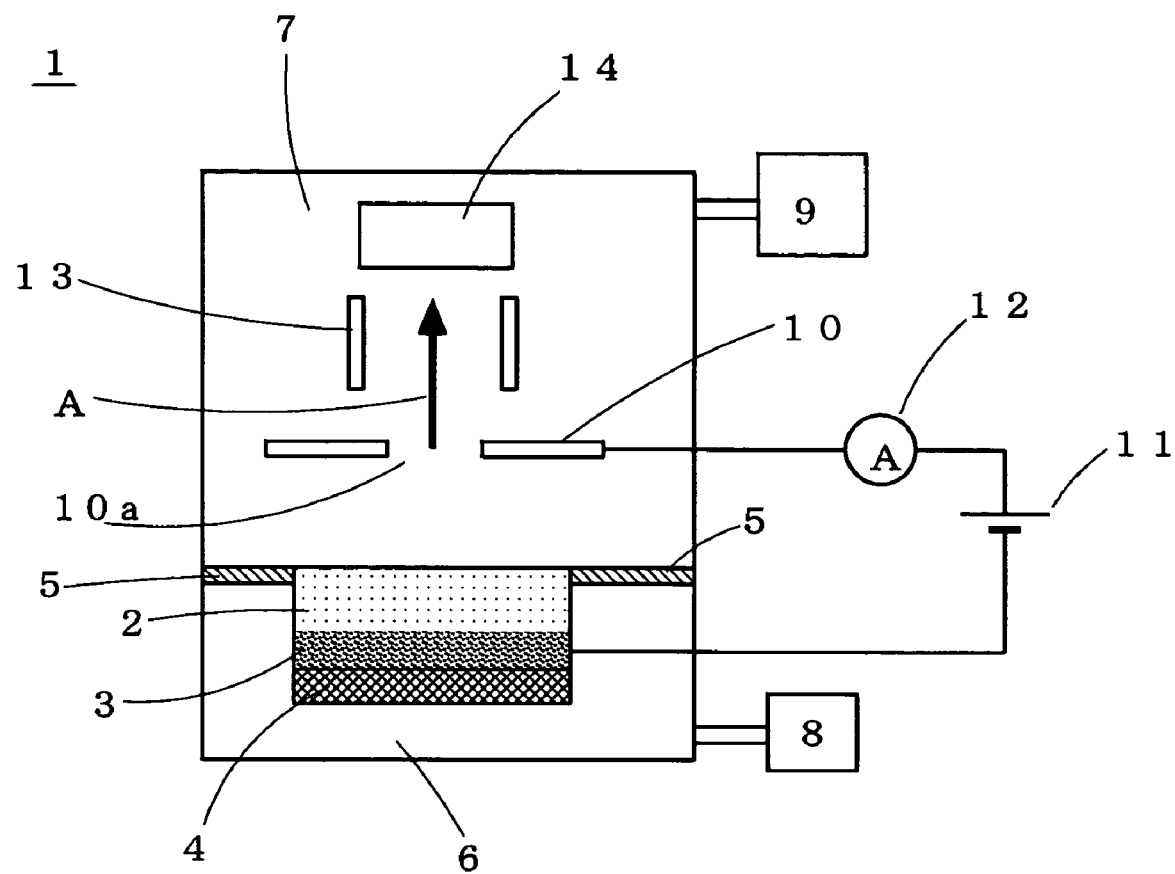
FIG. 2 is an illustration for explaining an embodiment of an apparatus for producing negatively charged oxygen atoms according to the present invention.

FIG. 2 is an illustration for explaining an embodiment of an apparatus for producing negatively charged oxygen atoms according to the present invention.

An apparatus 1 for producing negatively charged oxygen atoms comprises a baked body 2 made of a calcium-aluminum composite oxide, a negative electrode 3 disposed on a surface of the baked body 2, and a heating means 4 such as an electric heater for heating the baked body.

The inside of the apparatus 1 is divided by a partition wall 5 into an oxygen supply compartment 6 and a negatively charged oxygen atom producing compartment 7.

Connected to the oxygen supply compartment 6 is an oxygen supply source 8. Connected to the negatively charged oxygen atom producing compartment 7 is a vacuum device 9.

In the negatively charged oxygen atom producing compartment 7, a positive electrode 10 is disposed apart from the baked body 2. The apparatus 1 is provided with a power source 11 applying voltage between the negative electrode 3 and the positive electrode 10 and with an ampere meter 12 for measuring current flowing between the electrodes.

In the negatively charged oxygen atom producing compartment 7, a quadrupole lens 13 for controlling the direction and focusing the negatively charged oxygen atom beam and a target 14 are disposed.

Hereinafter, description will be made as regard to main components.

The negative electrode 3 disposed on the surface of the baked body 2 may be made of any of materials capable of allowing current application to the baked body. However, since the negative electrode 3 is arranged in the oxygen supply compartment 6, the negative electrode 3 is preferably made of a conductive material such as a metal or a conductive metal oxide which is not oxidized or not corroded even when heated in oxygen atmosphere. That is, preferable materials are noble metals such as gold and platinum, nickel, and stainless steel. Among them, gold and platinum are especially preferable.

Examples of methods for forming the negative electrode 3 on the surface of the baked body 2 include a method of applying a conductive composition containing a metal, a conductive material for forming an electrode onto the baked body, a method of depositing a metal for forming an electrode by vacuum deposition process such as sputtering or chemical vapor deposition (CVD), and a method of attaching a mesh-like metal to the baked body. Among these methods, the method of applying a conductive composition to the baked body has the advantage of being able to form the electrode into any configuration.

It is believed that oxygen molecule adheres to the metal electrode formed on the surface of the baked body so as to generate oxygen ions and is introduced into the baked body. Therefore, the electrode to be formed on the surface of the baked body is preferably made of a noble metal such as platinum which advantageously acts to promote adhesion and ionization of oxygen molecule.

The thickness of the cathode is in a range of from 0.1 μm to 50 μm, preferably from 0.5 μm to 10 μm, in terms of strength and easiness of handling.

The heating means 4 for the baked body 2 may be disposed not only in contact with the baked body as shown in FIG. 2 but also at some distance from the baked body. In this case, the heating means may be an infrared lamp, a high-frequency induction heating device, or the like.

The examples of material of the positive electrode 10 include alloys such as stainless steel, noble metals such as gold and platinum, and metals such as nickel which are stable against oxygen. Among these, stainless steel (for example, SUS304 or SUS430) which can be easily handled and has great durability is preferable. The positive electrode 10 may have a rod-like body, a wire-like body, a mesh-like body, a plate-like body, or a disk-like body having an opening 10a formed at the center thereof as shown in FIG. 2.

Alternatively, a member made of a material not having conductivity on which a film or layer made of such a metal by sputtering or chemical vapor deposition may be used.

The distance between the baked body 2 and the positive electrode 10 is in a range of from 5 to 100 mm, preferably from 10 to 50 mm, more preferably from 10 to 30 mm for the purpose of effective utilizing generated negatively charged oxygen ions and generaging negatively charged oxygen atoms at a low voltage.

The production of negatively charged oxygen atoms is carried out after the inside of the negatively charged oxygen atom producing compartment 7 is vacuumed by the vacuum device 9 connected to the negatively charged oxygen atom producing compartment 7 in order to prevent generated negatively charge oxygen atoms from vanishing due to collision with moisture and the like in the air.

In the state that oxygen is supplied to the oxygen supply compartment 6, the baked body 2 is heated by the heating means 4 and, at the same time, power is supplied to the negative electrode 3 and the positive electrode 10 from the power source 11, thereby sequentially generating negatively charged oxygen atoms A so that the generated negatively charged oxygen atoms A reach the target 14 disposed inside the negatively charged oxygen atom producing compartment.

In order to observe the generation of negatively charged oxygen atoms in the negatively charged oxygen atom producing compartment, the inside of the negatively charged oxygen atom producing compartment is vacuumed to have a degree of vacuum of 0.13 Pa or less and the detection is carried out by using a secondary electron multiplier (SEM) to the target 14.

In case of forming an oxidized film on a surface of a silicon wafer, the silicon wafer is disposed in place of the target.

When the inside of the negatively charged oxygen atom producing compartment is filled with a rare gas such as a helium gas or an argon gas, generated negatively charged oxygen atoms can be prevented from vanishing due to the reaction so that it is not necessary to vacuum the inside of the negatively charged oxygen atom producing compartment.

The position where the target is placed is a position so enough closer to the baked body that generated negatively charged oxygen atoms can reach and is from 1 to 100 mm, preferably from 5 to 50 mm from the baked body.

The potential difference between the negative electrode and the positive electrode is in a range of from 1 to 2000 V/cm, preferably from 10 to 1000 V/cm, more preferably from 50 to 500 V/cm. In case of 1 V/cm or less, the productivity is low. In case of 2000 V/cm or more, the baked body or the electrodes may be damaged.

The power source for applying voltage may be any power source such as a buttery, a rectified power source, or the like.

The baked body is preferably heated at a temperature of from 200° C. to 1000° C., more preferably from 500° C. to 800° C. In case of 200° C. or less, the generation efficiency is insufficient. In case of 1000° C. or more, it is required to use special heat-resistance material and therefore it is not preferable.

In the apparatus for producing negatively charged oxygen atoms of the present invention, the generation of negatively charged oxygen atoms can be stopped by stopping the application of voltage. Therefore, the start and stop of generation of negatively charged oxygen atoms can be controlled by ON-OFF operation of the power source. Further, according to the present invention, the generation amount of negatively charged oxygen atoms can be suitably controlled by adjusting the voltage between the positive electrode and the negative electrode.

While voltage is applied between the electrodes, oxygen as the raw material for generating negatively charged oxygen atoms is supplied from oxygen supply means such as air, thereby generating negatively charged oxygen atoms.

Figure 3:
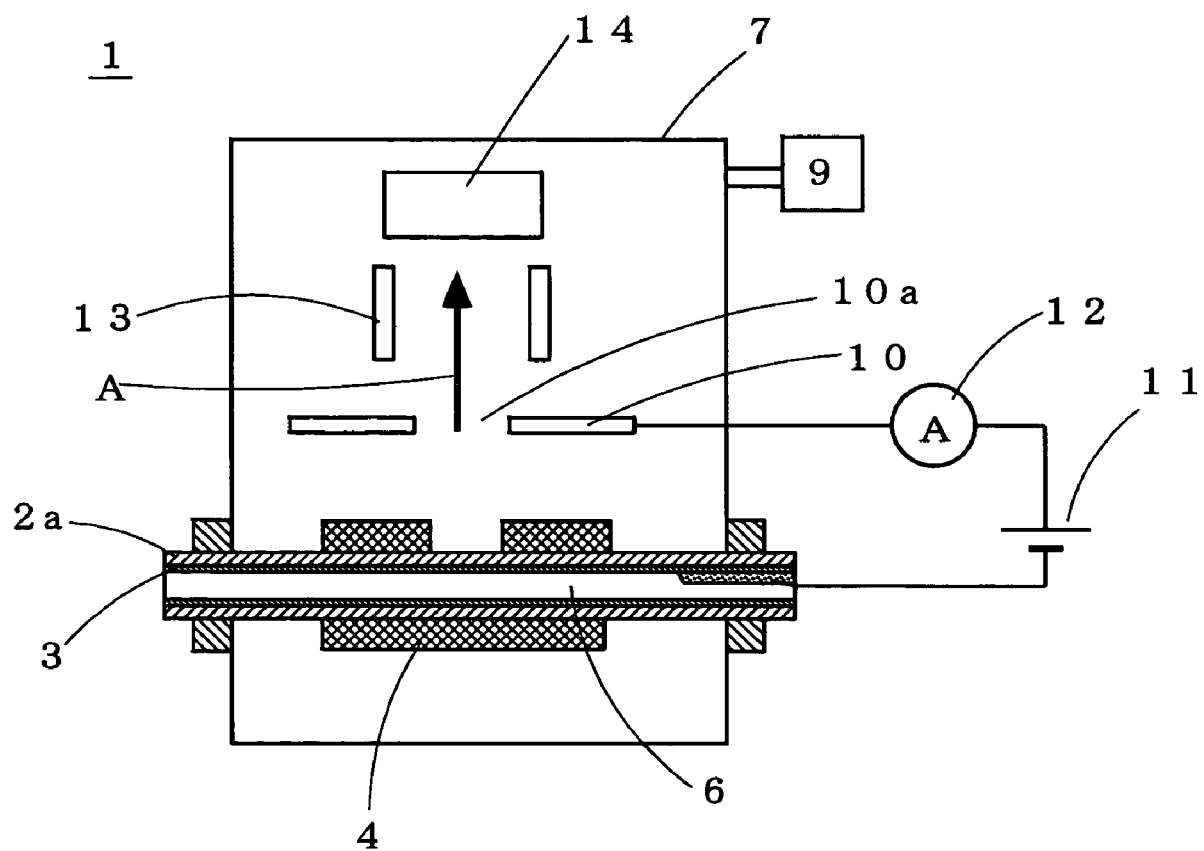
FIG. 3 is an illustration for explaining another embodiment of the apparatus for producing negatively charged oxygen atoms according to the present invention.

FIG. 3 is an illustration for explaining another embodiment of the apparatus for producing negatively charged oxygen atoms according to the present invention.

An apparatus 1 for producing negatively charged oxygen atoms shown in FIG. 3 comprises a hollow baked body 2a made of a calcium-aluminum composite oxide, a negative electrode 3 disposed inside the baked body 2a, and a heating means 4 such as an electric heater for heating the baked body which is disposed on the outer periphery of the baked body 2a. The inside of the apparatus 1 is divided into a negatively charged oxygen atom producing compartment 7 which is outside of the hollow baked body 2a and an oxygen supply compartment 6 which is inside of the hollow baked body 2a. Connected to the negatively charged oxygen atom producing compartment 7 is a vacuum device 9.

In the negatively charged oxygen atom producing compartment 7, a positive electrode 10 is disposed apart from the baked body 2a and has an opening 10a formed at the center thereof. The apparatus 1 is provided with a power source 11 applying voltage between the negative electrode 3 and the positive electrode 10 and with an ampere meter 12 for measuring current flowing between the electrodes.

In the apparatus for producing negatively charged oxygen atoms shown in FIG. 3, negatively charged oxygen atoms A are generated by the same operation as that of the apparatus shown in FIG. 2.

Figure 4:
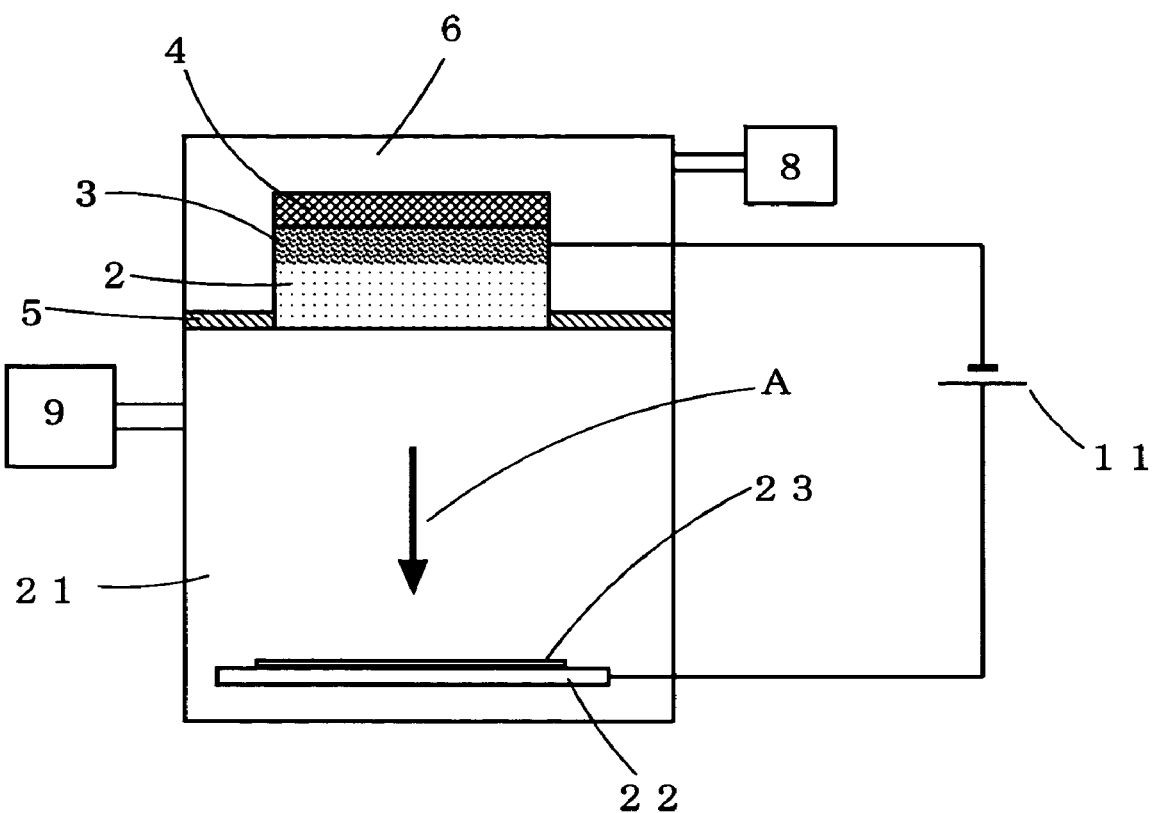
FIG. 4 is an illustration for explaining an example of a manufacturing equipment of a semiconductor device including an apparatus for producing negatively charged oxygen atoms according to the present invention.

FIG. 4 is an illustration for explaining an example of a processing equipment for a semiconductor device including an apparatus for producing negatively charged oxygen atoms according to the present invention.

A processing equipment 20 for a semiconductor device has a processing chamber 21 and is provided with an apparatus for producing negatively charged oxygen atoms on an upper part of the processing chamber 21. The apparatus comprises a baked body 2 made of a calcium-aluminum composite oxide, a negative electrode 3 disposed on a surface of the baked body 2, and a heating means 4 such as an electric heater for heating the baked body. The inside of the processing equipment 20 is divided by a partition wall 5 into an oxygen supply compartment 6 and the processing chamber 21.

Connected to the oxygen supply compartment 6 is an oxygen supply source 8. Connected to the processing chamber 21 is a vacuum device 9.

In the processing chamber 21, a substrate pallet 22 having electrical conductivity is arranged and a semiconductor substrate 23 is placed on the substrate pallet 22. The substrate pallet 22 is connected to the positive pole of a power source so that voltage is applied to the substrate pallet 22.

After the processing chamber 21 is vacuumed by the vacuum device 9 to have a predetermined degree of vacuum, the baked body 2 is heated and oxygen is supplied to the oxygen supply compartment 6. In this state, voltage is applied to the negative electrode and the substrate pallet which functions as a positive electrode, thereby generating negatively charged oxygen atoms A so that the generated negatively charged oxygen atoms A reach the semiconductor substrate 23 and thereby permitting various processes to the semiconductor substrate.

By adjusting the irradiation area, the negatively charged oxygen atoms can be adopted as fine-processing means or a processing means for the entire surface of the semiconductor substrate.

As an example of processes, silicon is oxidized by reaction with negatively charged oxygen atoms A, thereby forming an oxidized film.

According to the method for producing negatively charged oxygen atoms of the present invention, the generation amount of negatively charged oxygen atoms can be greatly changed by changing the voltage to be applied to the calcium-aluminum composite oxide, thereby making it possible to form oxidized films of various thicknesses from an ultrathin oxidized film such as a nanometre-scale oxidized film to a thick oxidized film.

Since the negatively charged oxygen atoms of the present invention have large oxidizing capability, the negatively charged oxygen atoms can be used for the ashing process for decomposing and removing a resist formed on the semiconductor substrate.

Conventionally, oxygen plasma is generally used for the ashing process. Since the oxygen plasma contains large component of energy produced simultaneously, the oxygen plasma may cause adverse effects on semiconductor devices to be manufactured. On the other hand, the apparatus for producing negatively charged oxygen atoms of the present invention produces negatively charged oxygen atoms only so that it never cause adverse effects on semiconductor devices.

In case of a resist altered by ion implantation or inorganic material, the resist is hardly removed by oxygen plasma. Even in this case, the resist can be removed for a short period of time because of large reactivity of negatively charged oxygen atoms.

Figure 5:
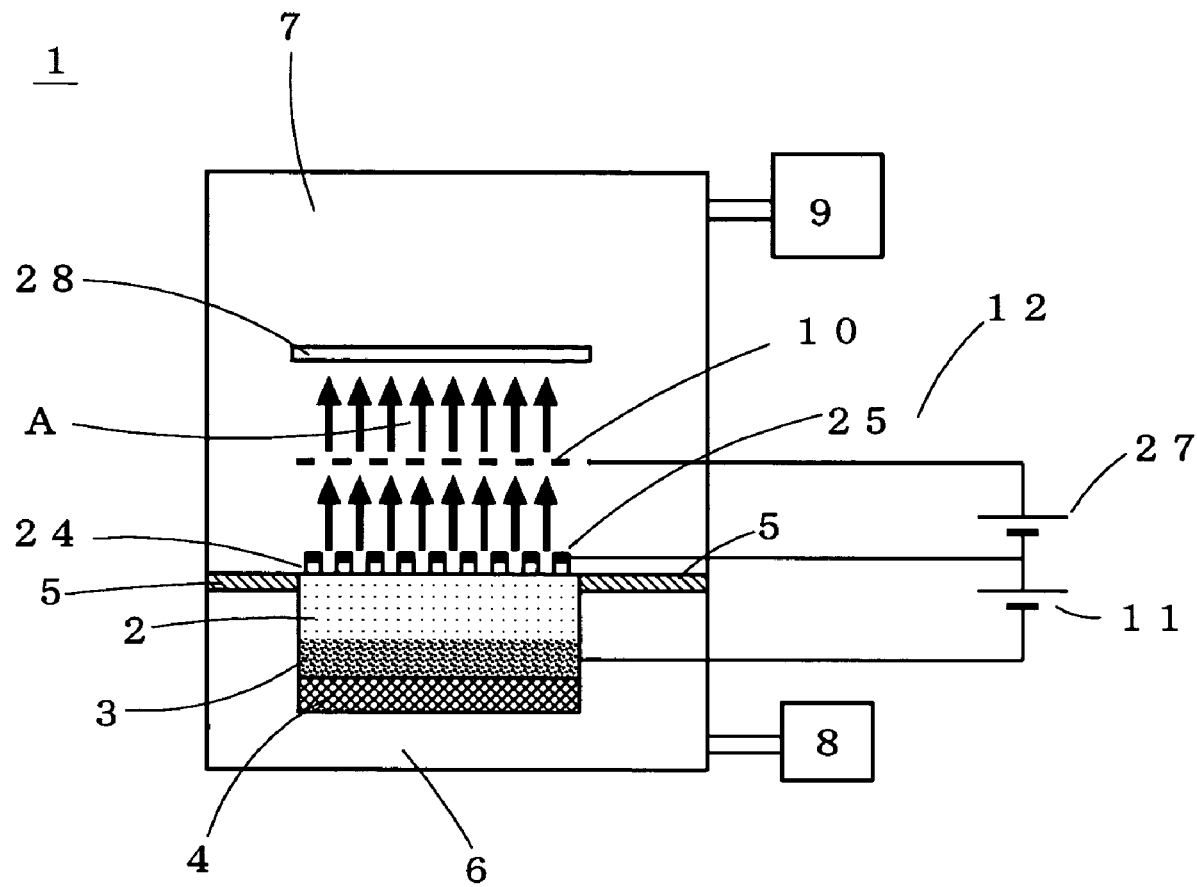
FIGS. 5(A), 5(B) are illustrations for explaining another embodiment of the apparatus for producing negatively charged oxygen atoms according to the present invention.
Figure 5:
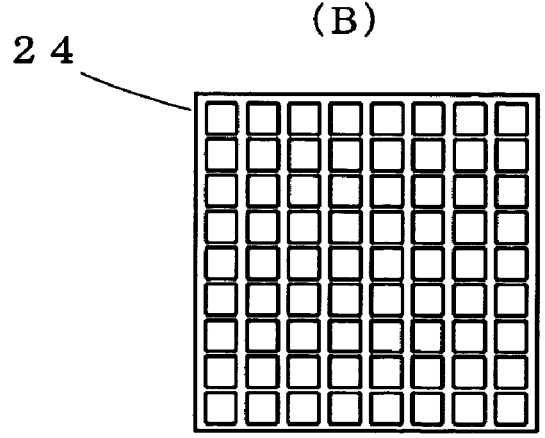

FIGS. 5(A), 5(B) are illustrations for explaining another embodiment of the apparatus for producing negatively charged oxygen atoms according to the present invention.

FIG. 5(A) is an illustration showing the entire structure of the apparatus for producing negatively charged oxygen atoms.

An apparatus 1 for producing negatively charged oxygen atoms comprises a baked body 2 made of a calcium-aluminum composite oxide, a negative electrode 3 disposed on a surface of the baked body 2, and a heating means 4 such as an electric heater for heating the baked body. The inside of the apparatus 1 is divided by a partition wall 5 into an oxygen supply compartment 6 and a negatively charged oxygen atom producing compartment 7.

Connected to the oxygen supply compartment 6 is an oxygen supply source 8. Connected to the negatively charged oxygen atom producing compartment 7 is a vacuum device 9.

In the negatively charged oxygen atom producing compartment 7, a spacer 24 is disposed on a surface of the baked body 2 opposite to the surface on which the negative electrode 3 is disposed, and a positive electrode 25 is arranged above the spacer 24. Voltage is applied between the negative electrode 3 and the positive electrode 25 from a power source 11.

The negative electrode 3 and the positive electrode 25 are disposed to face each other via the baked body 2 and the spacer 24 so that the distance therebetween is shorter than that in case that the positive electrode is disposed in a space. Therefore, large electric field intensity can be imparted to the baked body 2 even with smaller voltage.

A control electrode 26 is provided. Therefore, the flow of negatively charged oxygen atoms A extracted from the positive electrode side can be controlled by applying voltage from a control power source 27. As a result of this, negatively charged oxygen atoms can be projected to a desired portion of a target object 28 to be processed so that it is possible to form an oxide on a surface of the target object 28 or to remove material on a surface of the target object 28.

As for the spacer 24, ceramics of various types which is stable in the oxidation environment can be used. The spacer 24 may be made of alumina, silica, titania, zirconia, or the like.

The spacer 24 is obtained by forming a member having a large number of openings made of a ceramic such as alumina, silica, titania, or zirconia, and a forming an electrode made of a metal on a surface of the member, and is closely attached to the calcium-aluminum composite oxide.

As an alternative way, the spacer may be obtained by forming a film on the calcium-aluminum composite oxide by a vacuum deposition process such as plasma spraying of alumina, silica, titania, or zirconia, then forming a metal electrode layer, and forming openings for extracting negatively charged oxygen atoms by using a mask having a predetermined opening pattern.

FIG. 5(B) is a top view showing an example of the spacer.

The spacer 24 can comprise a lattice-like member as shown in FIG. 5(B) or a perforated plate and a positive electrode laminated on the surface of the lattice-like member or the perforated plate, thereby making it possible to apply uniform electric filed to the entire surface of the baked body. Accordingly, negatively charged oxygen atoms can be emitted from the entire surface of the baked body. The positive electrode can be laminated on the surface of the spacer or formed directly on the surface of the spacer.

Figure 6:
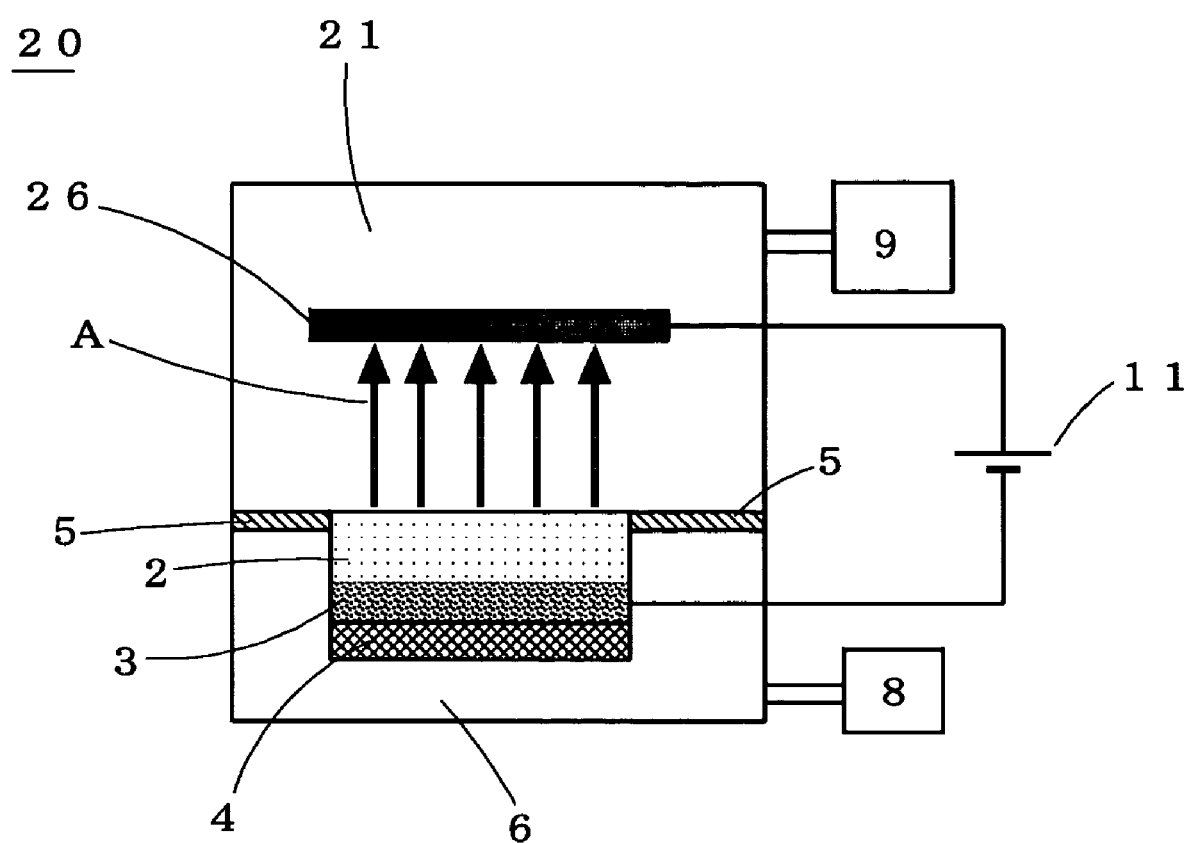
FIG. 6 is an illustration for explaining an example of a processing equipment including an apparatus for producing negatively charged oxygen atoms according to the present invention.

FIG. 6 is an illustration for explaining an example of a processing equipment including an apparatus for producing negatively charged oxygen atoms according to the present invention.

A processing equipment 20 has a processing chamber 21 and is provided with an apparatus 1 for producing negatively charged oxygen atoms in a lower part of the processing chamber 21. The apparatus comprises a baked body 2 made of a calcium-aluminum composite oxide, a negative electrode 3 disposed on a surface of the baked body 2, and a heating means 4 such as an electric heater for heating the baked body. The inside of the equipment 20 is divided by a partition wall 5 into an oxygen supply compartment 6 and the processing chamber 21.

Connected to the oxygen supply compartment 6 is an oxygen supply source 8. Connected to the processing chamber 21 is a vacuum device 9.

In the processing chamber 21, voltage is applied between a conductive target object 26 to be processed and the negative electrode. The target object functions also as a positive electrode for extracting negatively charged oxygen atoms so that the negatively charged oxygen atoms extracted from the baked body 2 reach a surface of the target object so as to oxidize the surface or remove material from the surface.

Hereinafter, the present invention will be further detailed by means of the following Examples.

EXAMPLE 1

Calcium carbonate and aluminum oxide of which mean particle diameter was 1 μm were mixed in such a manner to set a molar ratio ($CaCO_3$:$Al_2O_3$) therebetween to be 12:7. The mixture was baked at 1350° C. for 6 hours in dry air atmosphere to obtain baked powder.

The obtained baked powder was molded by a molding machine at 9.81 MPa into a disk-like pellet of 15 mm in diameter and 1 mm in thickness.

The pellet was heated in dry air atmosphere at 1350° C. for 6 hours to obtain a pellet-like baked body.

Gold paste (available from Nihon Kin-eki K.K.) was applied to a flat surface of the obtained baked body, was heated to 650° C., and was dried so as to form a negative electrode made of gold having a thickness of 5 μm.

As shown in FIG. 2, the baked body was installed to the partition wall. In the negatively charged oxygen atom producing compartment, a mesh-like positive electrode made of stainless steel (SUS304) was disposed at a position to have a distance of 10 mm from the negative electrode.

A secondary electron multiplier was placed as a target at a position 100 mm apart from the positive electrode.

The inner pressure of the negatively charged oxygen atom producing compartment was reduced to be $1 \times 10^{-3}$ Pa. However, there was no leak from the baked body.

In the state that the inner pressure of the negatively charged oxygen atom producing compartment was kept at $1 \times 10^{-3}$ Pa, the temperature of the baked body was increased to 700° C. by a heater mounted on the baked body and voltage of 500 V was applied between the positive electrode and the negative electrode. As a result of this, an electric current of 1 μA between the electrodes was observed by an ampere meter 12.

Figure 7:
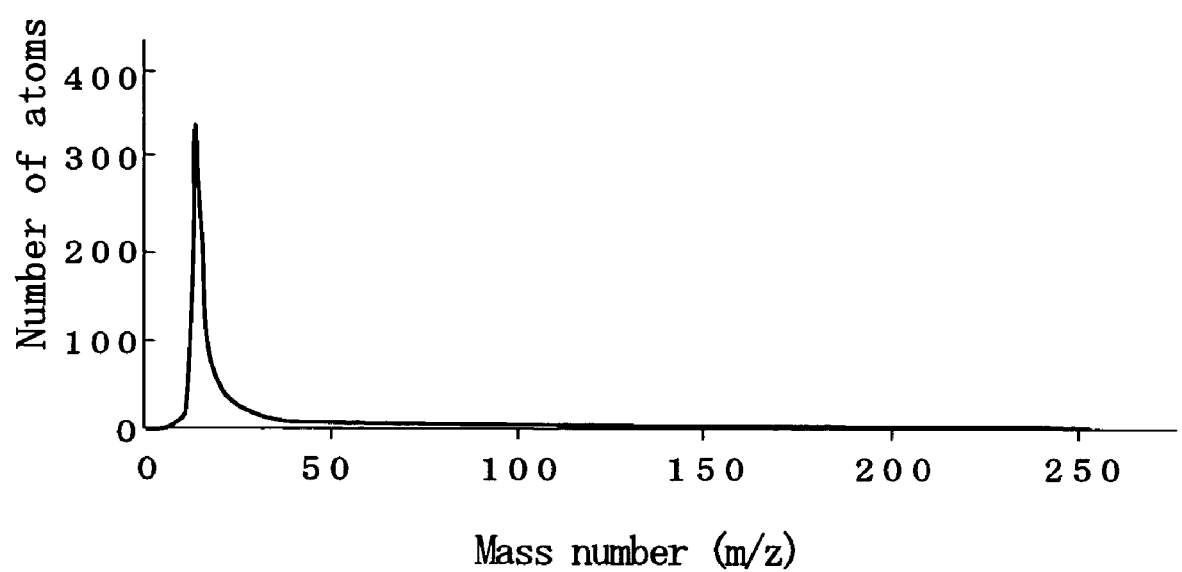
FIG. 7 is a graph for explaining results of mass spectroscopy.

Negatively charged oxygen atoms from the secondary electron multiplier were analyzed by a quadrupole mass spectrometer with applying voltage. In this manner, the mass spectroscopy was carried out. The result is shown in FIG. 7.

A peak was observed at a mass number 16. That is, the generation of negatively charged oxygen atoms was confirmed.

EXAMPLE 2

Baked powder made of a calcium-aluminum composite oxide which was prepared under the same condition as that of Example 1 was molded by a molding machine at 9.81 MPa into a cylindrical molded body of 200 mm in length, 20 mm in outer diameter, and 18 mm in inner diameter.

The molded body was heated in dry air atmosphere at 1350° C. for 6 hours to obtain a cylindrical baked body.

Gold paste (available from Nihon Kin-eki K.K.) was applied to the inner surface of the obtained baked body, was heated to 650° C., and was dried so as to form an electrode made of gold having a thickness of 5 μm on the inner surface.

As shown in FIG. 3, the baked body was installed to the vessel. In the negatively charged oxygen atom producing compartment, a mesh-like positive electrode made of stainless steel (SUS304) was disposed at a position to have a distance of 10 mm from the negative electrode.

A secondary electron multiplier was placed as a target at a position 100 mm apart from the positive electrode.

The inner pressure of the negatively charged oxygen atom producing compartment was reduced to be $1.33 \times 10^{-3}$ Pa. However, there was no leak from the baked body.

Then, the temperature of the baked body was increased to 700° C. by a heater mounted on the baked body and voltage of 500 V was applied between the positive electrode and the negative electrode. As a result of this, an electric current of 3 μA between the electrodes was observed by an ampere meter 12.

After that, negatively charged oxygen atoms from the secondary electron multiplier were analyzed by a quadrupole mass spectrometer with applying voltage. In this manner, the mass spectroscopy was carried out. The result of the mass spectroscopy after a lapse of 2 hours from the application of voltage was observed and was equal to the result shown in FIG. 7.

From the result, it was found that negatively charged oxygen atoms are generated sequentially by applying voltage.

EXAMPLE 3

Negatively charged oxygen atoms were generated in the same manner as Example 2 except that a silicon wafer of 20 mm in diameter and 1 mm in thickness was mounted as a target. The silicon wafer was irradiated with thus generated negatively charged oxygen for 30 minutes.

Figure 8:
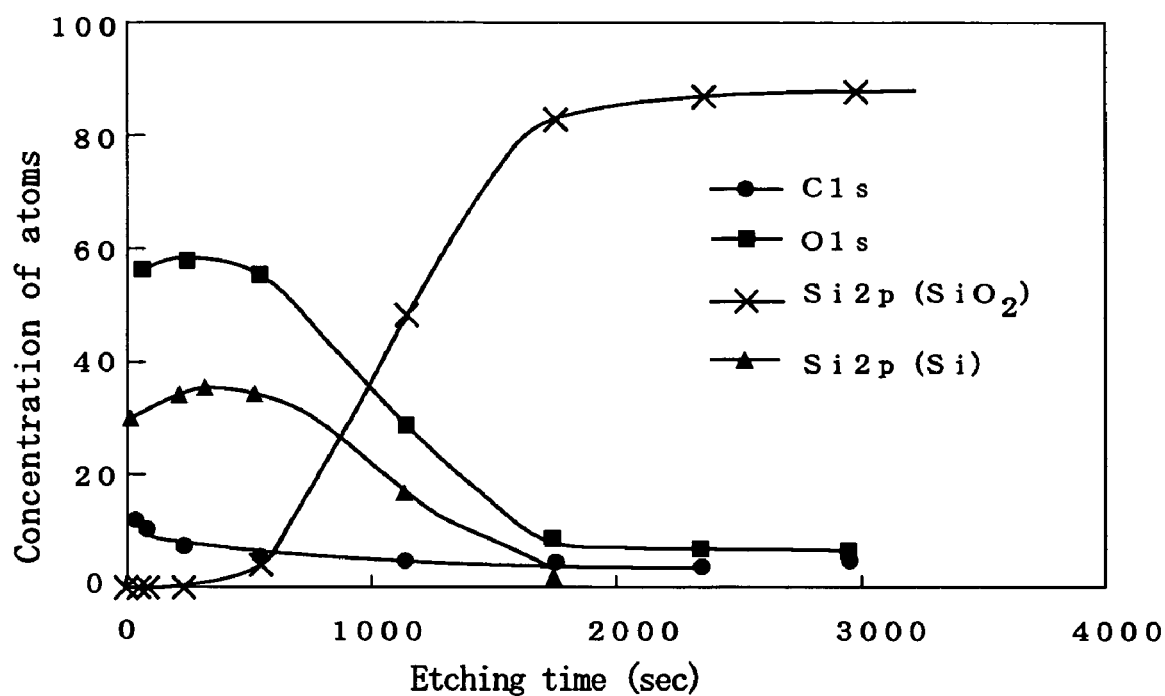
FIG. 8 is a graph for explaining results of X-ray photoelectron spectroscopy analysis.

The thickness of an oxidized film formed on the silicon wafer after irradiation was measured by a film thickness meter (ESM-1A ellipsometer, available from ULVAC, Inc.) and was 25 nm. As for the formed film, the composition of the film which was etched by argon was observed by an X-ray photoelectron spectrometer (ESCA-3200, available from Shimadzu Corporation). The result was shown in FIG. 8. It was confirmed that silicon oxide ($SiO_2$) was produced on the surface.

COMPARATIVE EXAMPLE 1

Test was conducted in the same manner as Example 2 except that an yttria stabilized Zirconia solid electrolyte cylinder (available from Nikkato) of 200 mm in length, 20 mm in outer diameter, and 2 mm in inner diameter was used instead of the cylindrical molded body made of calcium-aluminum composite oxide. Measurement was carried out in the same manner as Example 2.

Measured electric current was 3 nA of which value was $\frac{1}{1000}$ of that of Example 2. This means that only a slight amount of negatively charged oxygen atoms were generated.

INDUSTRIAL APPLICABILITY

The present invention utilizes characteristics of calcium-aluminum composite oxide so as to enable to efficiently produce negatively charged oxygen atoms without requiring great discharge energy and is very useful in various fields, for example, for various oxidative reactions, fabrication of silicon oxidized film in semiconductor manufacturing process, ashing process, mildew-proof treatment of food products, and maintaining sea food freshness.

What we claim is:

1. A method for producing negatively charged oxygen atoms, comprising the steps of:
   placing a negative electrode on a surface of a member made of calcium-aluminum composite oxide of which a molar ratio between calcium oxide and aluminum oxide is 12:7;
   proximately placing a positive electrode on a side of the member opposite to the surface on which the negative electrode is placed;
   supplying oxygen to a side of the member where the negative electrode is placed; and
   applying voltage between the negative electrode and the positive electrode to extract negatively charged oxygen atoms from the side where the positive electrode is placed.

2. A method for producing negatively charged oxygen atoms as claimed in claim 1, wherein the voltage is applied while heating the member to a temperature of from 200° C. to 1000° C.

3. A method for producing negatively charged oxygen atoms as claimed in claim 1, wherein the calcium-aluminum composite oxide is prepared by baking a mixture of calcium carbonate and aluminum oxide.

4. A method for producing negatively charged oxygen atoms as claimed in claim 3, wherein the calcium-aluminum composite oxide is prepared by baking the calcium carbonate and the aluminum oxide at a baking temperature of from 1300° C. to 1450° C.

5. A method for producing negatively charged oxygen atoms as claimed in claim 3, wherein the calcium carbonate and the aluminum oxide are baked in dry oxygen atmosphere of which oxygen partial pressure is 10 kPa or more and water vapor partial pressure is $10^{-3}$ Pa or less.

6. An apparatus for producing negatively charged oxygen atoms having an oxygen supply compartment and a negatively charged oxygen atom producing compartment which are defined by arranging a member made of calcium-aluminum composite oxide of which a molar ratio between calcium oxide and aluminum oxide is 12:7, the apparatus comprising
   a heating means disposed on the member made of calcium-aluminum composite oxide,
   a negative electrode placed on a surface of the member facing the oxygen supply compartment,
   a positive electrode placed in the negatively charged oxygen atom producing compartment on a side of the member opposite to the surface on which the negative electrode is placed, and
   a power source for applying voltage between the positive electrode and the negative electrode.

7. An apparatus for producing negatively charged oxygen atoms as claimed in claim 6, wherein the positive electrode is placed on the side of the member made of calcium-aluminum composite oxide opposite to the surface of the member on which the negative electrode is placed such that the positive electrode is spaced apart from the member made of calcium-aluminum composite oxide.

8. An apparatus for producing negatively charged oxygen atoms as claimed in claim 7; and
   wherein in place of the positive electrode, a conductive target object to be processed is placed on the side of the member made of calcium-aluminum composite oxide opposite to the surface of the member on which the negative electrode is placed such that the conductive target object is spaced apart from the member made of calcium-aluminum composite oxide, and wherein voltage is applied between the conductive target object and the negative electrode.

9. An apparatus for producing negatively charged oxygen atoms as claimed in claim 6, wherein the positive electrode is placed on a spacer which is attached to the surface of the member made of calcium-aluminum composite oxide opposite to the surface of the member on which the negative electrode is placed.

10. An apparatus for producing negatively charged oxygen atoms as claimed in claim 8, wherein a control electrode is arranged between the positive electrode and the conductive target object to be processed with negatively charged oxygen atoms.

11. An apparatus for producing negatively charged oxygen atoms as claimed in claim 6, wherein the calcium-aluminum composite oxide is prepared by baking a mixture of calcium carbonate and aluminum oxide.

12. A processing equipment for conducting process by negatively charged oxygen atoms having an oxygen supply compartment and a negatively charged oxygen atom producing compartment which are defined by arranging a member made of calcium-aluminum composite oxide of which a molar ratio between calcium oxide and aluminum oxide is 12:7, the processing equipment comprising:
 a heating means disposed on the member made of calcium-aluminum composite oxide,
 a negative electrode placed on a surface of the member facing the oxygen supply compartment,
 a positive electrode placed in the negatively charged oxygen atom producing compartment on a side of the member opposite to the surface on which the negative electrode is placed, and
 a power source for applying voltage between the positive electrode and the negative electrode,
 wherein a target object to be processed is placed on a side of the positive electrode opposite to the side where the negative electrode is provided.

* * * * *